United States Patent
Mercredi et al.

(10) Patent No.: US 10,499,010 B2
(45) Date of Patent: *Dec. 3, 2019

(54) GROUP VIDEO SESSION

(71) Applicant: Facebook, Inc., Menlo Park, CA (US)

(72) Inventors: Dwayne B. Mercredi, Kirkland, WA (US); Pavol Mravec, Redmond, WA (US); Chi Wang Ho, Redmond, WA (US); Naizhi Li, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,568

(22) Filed: Nov. 7, 2018

(65) Prior Publication Data

US 2019/0215483 A1     Jul. 11, 2019

Related U.S. Application Data

(63) Continuation of application No. 15/395,172, filed on Dec. 30, 2016, now Pat. No. 10,148,910.

(51) Int. Cl.
| | |
|---|---|
| *H04N 7/14* | (2006.01) |
| *H04L 29/06* | (2006.01) |
| *G06K 9/00* | (2006.01) |
| *H04N 7/15* | (2006.01) |
| *G06Q 50/00* | (2012.01) |

(52) U.S. Cl.
CPC ......... *H04N 7/147* (2013.01); *G06K 9/00302* (2013.01); *G06K 9/00744* (2013.01); *G06Q 50/00* (2013.01); *H04L 65/1089* (2013.01); *H04L 65/403* (2013.01); *H04L 65/60* (2013.01); *H04N 7/15* (2013.01); *H04N 7/155* (2013.01); *G06K 2009/00738* (2013.01)

(58) Field of Classification Search
CPC .......... H04N 7/147; H04N 7/15; G06Q 50/00; H04L 65/60; H04L 65/403; G06K 9/00302; G06K 2009/00738

See application file for complete search history.

(56) References Cited

U.S. PATENT DOCUMENTS

| | | | |
|---|---|---|---|
| 10,033,963 B1 * | 7/2018 | Mercredi | H04L 65/403 |
| 10,148,910 B2 * | 12/2018 | Mercredi | G06K 9/00744 |
| 2011/0043602 A1 * | 2/2011 | Lee | G06F 9/543 |
| | | | 348/14.09 |
| 2013/0290434 A1 * | 10/2013 | Bank | G06Q 10/10 |
| | | | 709/206 |
| 2017/0060917 A1 * | 3/2017 | Marsh | H04L 65/1069 |

* cited by examiner

*Primary Examiner* — Stella L. Woo
(74) *Attorney, Agent, or Firm* — Baker Botts L.L.P.

(57) ABSTRACT

In one embodiment, a computer server machine receives, from one or more client devices, one or more video streams associated with a video session associated with one or more users. The one or more users are respectively associated with each client device. The computer server machine analyzes the one or more video streams to identify an interesting event and generates a marker for the one or more video streams based on a time associated with the identified interesting event. The computer server machine sends information regarding the marker to the one or more client devices.

20 Claims, 7 Drawing Sheets

GROUP VIDEO SESSION

PRIORITY

This application is a continuation under 35 U.S.C. § 120 of U.S. patent application Ser. No. 15/395,172, filed 30 Dec. 2016.

TECHNICAL FIELD

This disclosure generally relates to reporting and recording video streams in a video session.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

In addition, the mobile computing device may communicate one or more video streams to a system. The system may communicate the one or more video streams to a mobile computing device.

SUMMARY OF PARTICULAR EMBODIMENTS

Particular embodiments provide techniques to identify and send interesting events of one or more video streams in a video session. A computer server machine receives, from one or more client devices one or more video streams associated with a video session associated with one or more users. The one or more users are respectively associated with each client device. The computer server machine analyzes the one or more video streams to identify an interesting event and generates a marker for the one or more video streams based on a time associated with the identified interesting event. The computer server machine sends information regarding the marker to the one or more client devices.

In addition, particular embodiments provide techniques to provide a persistent real-time group chatroom that notifies non-active participants of activity in the group chatroom. A computer server machine maintains a persistent real-time group chatroom comprising one or more participants. At any given time, zero or more participants are active in the group chatroom. The computer server machine receives one or more video streams associated with a video session associated with one or more users. The video streams are communicated from one or more client devices with each client device respectively associated with the one or more users. The computer server machine provides a notification to one or more non-active participants, wherein the one or more non-active participants are not active in the persistent real-time group chatroom.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
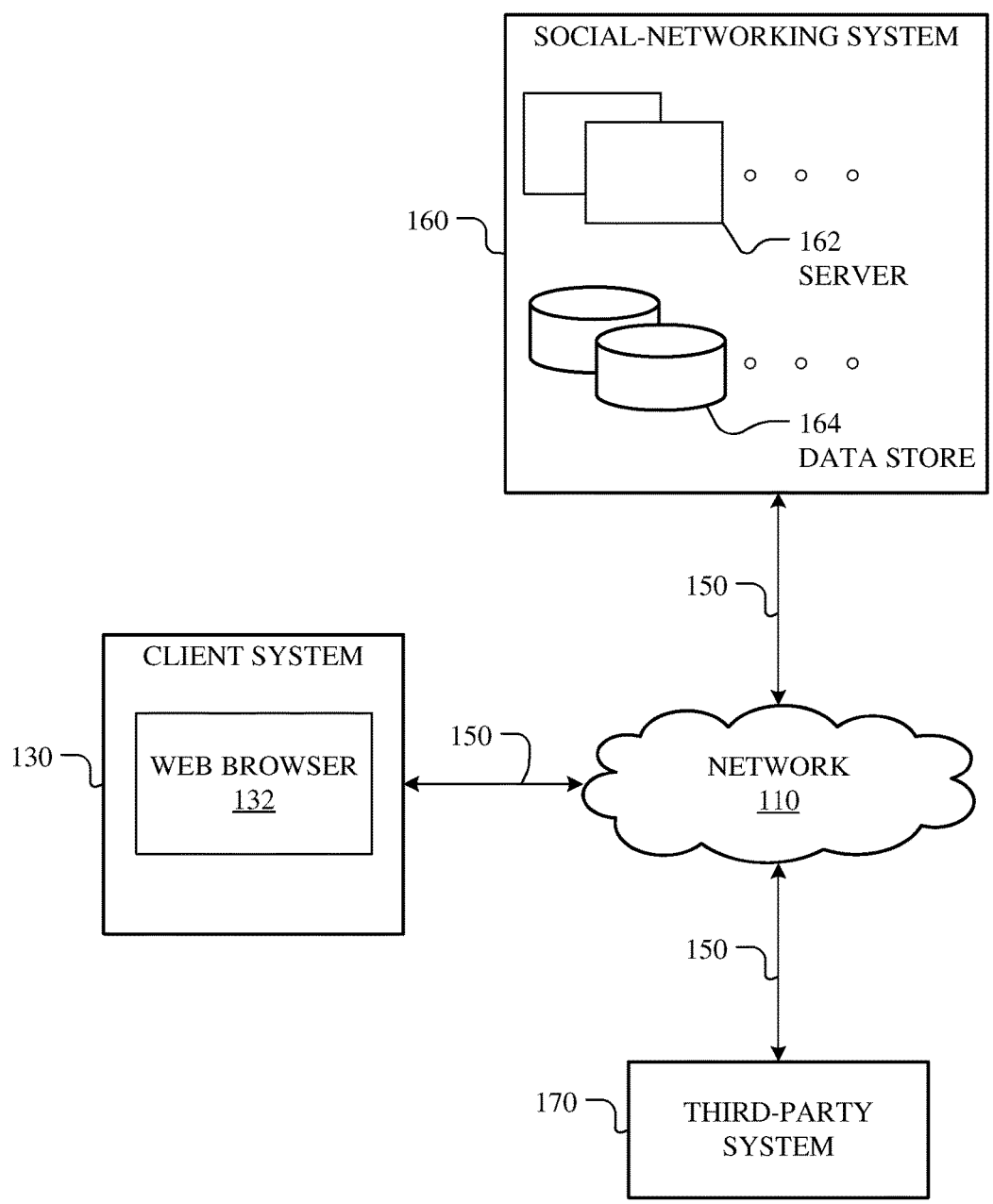
FIG. 1 illustrates an example network environment associated with a social-networking system.

Client devices may communicate one or more video streams to a computer server machine. The video streams may be associated with a video session, and each client device may respectively be associated with a user. The computer server machine, in turn, may communicate the one or more video streams associated with a video session to one or more client devices.

This approach may be limited and inefficient. For example, a user associated with the client device receiving the one or more video streams associated with the video session may either be required to view each of the one or more video streams to identify an interest moment. Moreover, a user associated with the client device receiving the one or more video streams may overlook an interesting moment associated with one or more video streams.

Accordingly, particular embodiments provide techniques to identify and record interesting events by individuals in a video session. A computer server machine receives, from one or more client devices, one or more video streams associated with a video session associated with one or more users. The one or more users are respectively associated with each client device. The computer server machine analyzes the one or more video streams to identify an interesting event and generates a marker for the one or more video streams based on a time associated with the identified interesting event. The computer server machine sends information regarding the marker to the one or more client devices.

In addition, in a real-time group chatroom, a computer server machine may receive one or more video streams from one or more client devices with each client device respective associated with a user. The computer server machine, in turn, may communicate the one or more video streams to one or more client devices. Moreover, when no participants are active in the group chatroom, the group chatroom may cease to exist.

This approach may also be limited and inefficient. For example, a persistent real-time group chatroom may continue to be active even when zero participants are active. In addition, a non-active participant that is not active in the persistent real-time group chatroom may receive a notification if one or more participants become active (e.g., communicating a video stream) in the group chatroom.

Accordingly, particular embodiments provide techniques to provide a persistent real-time group chatroom that notifies non-active participants of activity in the group chatroom. A computer server machine maintains a persistent real-time group chatroom comprising one or more participants. At any given time, zero or more participants are active in the group chatroom. The computer server machine receives one or more video streams associated with a video session associated with one or more users. The video streams are communicated from one or more client devices with each client device respectively associated with the one or more users. The computer server machine provides a notification to one or more non-active participants, wherein the one or more non-active participants are not active in the persistent real-time group chatroom.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In certain embodiments, server 162 comprises a computer server machine. Computer server machine may be any component in social-networking system 160 and can communicate with any component inside social-networking system 160. However, although computer server machine is described herein as server 162, computer server machine may be any component that exists independent of social-networking system 160. For example, computer server machine may be a standalone module that is external to social-networking system 160. In particular embodiments, computer server machine may communicate with third-party system 170 and client system 130.

In certain embodiments, client system 130 comprises a client device. Client device may be any component in social-networking system 160 and can communicate with any component inside social-networking system 160. However, although client device is described herein as client system 130, client device may be any component that exists independent of social-networking system 160. For example, client device may be a standalone module that is external to social-networking system 160. In particular embodiments, client device may communicate with server 162 and third-party system 170.

In an exemplary embodiment of operation, server 162 receives one or more video streams from one or more client systems 130. Video streams may be a form of multimedia that is transmitted over the Internet in near real time. Rather than wait for the entire video to arrive, server 162 may continuously receive and capture the received video stream. Client system 130 may capture a video stream by using a video camera, microphone, speaker, or any other mechanism to record video and/or audio. In certain embodiments, a video stream may comprise a video component, an audio component, or both a video and audio component. Client system 130 may transmit a video stream to server 162. In certain embodiments, multiple client systems 130 may each respectively transmit a video stream to server 162.

Moreover, the video streams may be associated with a video session. A video session comprises at least one video stream. A video session may comprise video streams from one or more video streams associated with one or more users wherein the one or more users are communicating with one another. In certain embodiments, a video session contains one or more active speakers and one or more active listeners. Server 162 may utilize a video session to determine how to display the one or more video streams associated with the video session to client systems 130. In certain embodiments, server 162 identifies the one or more active speakers and/or one or more active listeners. Server 162 may then communicate the one or more active speakers to client systems 130. In this embodiment, server 162 may still continue to capture and process the one or more active listeners. Moreover, server 162 may communicate the video component of a subset of one or more video streams and also communicate the audio component of each one or more video streams.

In certain embodiments, server 162 stores the received one or more video streams. Server 162 may store the entirety of the received video streams, or may store a predefined and/or adaptive segment of the received video stream. For example, server 162 may automatically store the previous ten minutes of the received one or more video streams. In certain embodiments, server 162 accesses a privacy server associated with the user of the one or more video streams to determine whether the privacy settings allow server 162 to store the received video streams. For example, certain European countries have strict image rights such that storing a video stream of a person may be unlawful without the express consent of the user. In these embodiments, server 162 will only store a video stream of the user if the user provides consent for server 162 to store the video. The user may provide consent for server 162 to store the video in the user's privacy settings stored on the privacy server.

Server 162 may analyze the one or more received video streams to identify an interesting event. An interesting event may be any type of noteworthy event that occurs in a video stream. For example, a sudden shriek in a video may be an interesting event in certain embodiments. Server 162 may analyze the one or more received video streams proactively as client system 130 communicates a video stream to server 162 and/or server 162 may analyze the video streams retroactively. The following paragraphs discuss exemplary methods for analyzing the one or more video streams to identify an interesting event.

In certain embodiments, server 162 may associate one or more actions associated with a video stream as an interesting event. For example, if a video stream receives several "like" actions during a time period, server 162 may flag that moment as an interesting moment. Server 162 may have a preset threshold for when to tag a video as interesting (e.g., a certain number of comments associated with the video stream) or the threshold may be adaptive. Actions, moreover, may constitute comments, likes, or any other type of user action that is associated with the one or more video streams.

Server 162 may also detect a change in audio content and determine the change in audio warrants marking as an interesting moment. As an example, a person may raise his or her voice on the audio stream. Server 162 may determine that the changing volume of the voice constitutes a change in audio and may mark that as an interesting moment. Server 162 may analyze the audio spectrum of the audio stream to determine if a change in the audio is significant to warrant labeling as an interesting moment.

In certain embodiments, server 162 detects a change in an attribute of the video stream, and record that change as an interesting moment. An attribute of the video stream may be one or more characteristics of the video and/or audio component of the video stream. For example, an attribute of the video stream may include quality of the video stream, lag of the video stream, amount of data used to stream video stream, users watching the video stream (including number of active viewers of the video stream), connection quality, audio and/or video format, frame rate, aspect ratio, bits per pixel, video compression method, or any other characteristic associated with the video stream.

Server 162 may also use facial recognition computer software to identify an emotion associated with a user of client system 130. In certain embodiments, server 162 may identify an interesting moment based on the emotion associated with the user of client system 130. For example, server 162 may automatically identify an interesting event when the user of client system 130 displays an emotion of surprise. Moreover, server 162 may identify a change in emotion as an interesting event.

Server 162 may also apply analysis on the environment captured in a video session of client system 130. Server 162 may detect a change in the environment (e.g., a cat walking across the room), may detect an unusual pattern in the environment (e.g., a shooting star), or may perform any other type of analysis such that server 162 can detect an interesting moment in the received one or more video stream.

In particular embodiments, server 162 may customize the detection of an interesting moment based on information related to the user profile associated with client device 130. Server 162 may customize the detection of an interesting moment based on a user's degree of connection to the user in the video stream, location, attending of same event, likes, dislikes, profile settings, privacy settings, or any other information that may customize the detection of an interesting moment. For example, server 162 may analyze the first-degree connections of a user associated with client device 130 to determine that the threshold for detecting an interesting moment may be lower for a first-degree connection as opposed to a farther-removed connection. Moreover, server 162 may determine different interesting moments of a video stream for different users. For example, server 162 may identify one moment as an interesting moment for a first user, but not identify that same moment as an interesting moment for a second user.

While the disclosure discusses server 162 as receiving the one or more video streams and identifying an interesting moment in the video streams, the disclosure also contemplates the one or more client systems 130 receiving the one or more video streams and identifying an interesting moment in the video stream. Moreover, the one or more client systems 130 may identify an interesting moment in the video stream that client system 130 captured. Client system 130 may identify the interesting moment in its captured video stream and communicate it to one or more servers 162.

When an interesting moment is identified, server 162 may generate a marker for one or more of the video streams based on a time associated with the identified interesting event. The marker may be a flag associated with the video stream, a table identifying the time associated with the video stream, or any other type of indication for a time associated with the interesting moment. In certain embodiments, server 162 identifies a time period of the video stream containing an interesting moment, and generates a marker indicating the time period. In addition, server 162 may generate a marker that precedes or is subsequent to the identified interesting moment. For example, server 162 may place a marker five seconds before the identified interest moment occurs. The placement of the marker corresponding to the time associated with the identified interesting event may be preset or adaptive. Server 162 may also record and/or store the one or more video streams for a time period associated with the time related to the identified interesting moment. For example, server 162 may record a video stream ten seconds prior to the beginning time associated with the identified interesting moment and conclude recording the video stream only after ten seconds elapses after the end time associated with the identified interesting moment.

In particular embodiments, server 162 may associate information regarding the interesting moment with the information regarding the marker. For example, server 162 may associate information regarding the identified emotion with the information regarding the marker. Additional information, such as actions associated with the interesting moment, video stream associated with the identified interesting moment, or any information about the identified interesting moment may be associated with the marker.

Server 162 may then send information regarding the marker to the one or more client systems 130. Server 162 may communicate the information regarding the marker in near real-time, or server 162 may communicate the information regarding the marker after the video session is completed.

Server 162 may also send the one or more video streams associated with the video session to the one or more client systems 130. Client system 130 may pause, rewind, and fast forward through the one or more video streams associated with the video session. Client system 130 may communicate the pause, rewind, and/or fast forward of the one or more video streams to server 162, and server 162 may respond with a corresponding portion of the one or more video streams. Moreover, client system 130 may also store the received one or more video streams, such that client system 130 can process and display a paused video stream, rewind a video stream, or fast forward a video stream. Client system 130 may also provide an option to rewatch an identified interesting moment in the one or more video streams.

In certain embodiments, server 162 may provide an overlay to one or more video streams to one or more client devices, wherein the overlay comprises an audio and/or visual indication corresponding to the identified interesting event. In particular, server 162 may provide an audio or visual indication corresponding to an expression associated with the identified interesting moment. As an example, server 162 may provide a surprise emoji that corresponds to an identified expression of surprise. As another example, server 162 may provide an overlay of the one or more video streams that was identified as an interesting moment to one or more client devices. The visual and/or audio indication may comprise of any type of indicator identifying the interesting moment. In certain embodiments, client system 130 receives the one or more video streams and provides an audio and/or visual overlay corresponding to an identified interesting event.

In particular embodiments, a user of client system 130 may have the option to save the video session and share the video session with other users. Client system 130 may offer a user to replay an identified interesting moment in real-time while watching the video session. Moreover, client system 130 may create a replay of the video session by developing a video stream of the identified interesting moments. For instance, in a retroactive identification of an interesting moment, the method can identify portions of the video that contains interesting moments. With the portions identified, the video can be played back such that the interesting moments will be played during the video. In addition, the method may statistically analyze the interesting moments of a video. The statistical analysis may be particularly relevant to a video session wherein a multitude of watchers are watching a main speaker. Additionally, in a real-time identification of an interesting moment, the method can notify the viewing users of an interesting moment that occurred, and also an option to playback the interesting moment.

In an additional exemplary embodiment of operation, server 162 may maintain a persistent real-time group chatroom comprising zero or more participants. The persistent real-time group chatroom may, at any given time, have zero or more of the participants are active. The persistent real-time group chatroom participants may be participants that have authorization to communicate within the chatroom. Participants may synchronously communicate with other members of the chatroom. A chatroom may exist as a standalone application on client system 130, may be a native application on client system 130, or may exist as an embedded feature in a larger application (e.g., a chatroom inside Facebook). In a persistent real-time group chatroom, the chatroom may continue to exist even if zero participants are active in the group chatroom.

Server 162 may receive, from one or more client systems 130, one or more video streams associated with one or more users. Each client system 130 may respectively be associated with a user. Typically, a user operates client system 130. Client 130 may capture and communicate a video stream to server 162. In certain embodiments, client system 130 may encrypt and/or compress the one or more video streams before transmitting the one or more video streams to server 162.

Server 162 may provide a notification to one or more non-active participants. Non-active participants may be participants that are not active in the persistent real-time group chatroom. For example, non-active participants may be participants that do not have the group chatroom window active and/or open, participants that have not interacted in the group chatroom for a period of time, or any other type of participant that is not active with the persistent real-time group chatroom.

Server 162 may provide notifications in a myriad of ways. For example, server 162 may communicate an e-mail to an e-mail address associated with the non-active participant, server 162 may provide a notification through the group chatroom to the non-active participant, or server 162 may provide an indication on the one or more client systems 130 of the non-active participants. In certain embodiments, client system 130 may provide a pop-up notification on client system 130's user interface.

In certain embodiments, server 162 records the one or more video streams associated with one or more users. A non-active participant may view the one or more video streams associated with one or more users at a later time. Moreover, a non-active participant may view portions of the one or more video streams, forward through portions of the one or more video streams, or rewind portions of one or more video streams. In an exemplary embodiment, server 162 identifies interesting moments in the one or more video streams and generates a marker based on a time associated with the identified interesting moments. A non-active participant may view portions of the one or more video streams associated with the time indicated in the marker identifying interesting moments in the one or more video streams. Server 162 may also create a review video session, wherein server 162 generates a video session based on the markers of the identified interesting moments in the one or more video streams and the associated video streams during the time indicated by the marker. In certain embodiments, server 162 may create a review video session by recording a portion of the video stream a set or dynamic time period before the interesting moment marker and continue recording for a set or dynamic time period after the interesting moment marker. Moreover, server 162 may allow a user to jump to one or more interesting moments in a video stream.

Moreover, server 162 may receive, from one or more client systems 130, an action. An action may include a comment in the persistent real-time group chatroom, a like on the chatroom, or any other types of action that is associated with the one or more video streams. Server 162 may associate the action with a time and/or one or more video streams. Server 162 may communicate the action alongside the recorded one or more video streams to the one or more non-active participants. In particular embodiments, server 162 may communicate one or more video streams to the non-active participant, and also, simultaneously, communicate the action to the non-active participant during playback. Client system 130 may play the one or more video streams such that the action corresponding to one or more video streams replicates the real-time display of the action to the one or more video streams.

Server 162 may communicate the one or more video streams associated with the video session to client systems 130. Participants of the group chatroom may also pause, rewind, and fast forward through the one or more video sessions. Client system 130 may communicate the pause, rewind, and/or fast forward of the one or more video sessions to server 162, and server 162 may respond with a corresponding portion of the one or more video sessions. Moreover, client system 130 may also store the received one or more video streams, such that client system 130 can process a paused, rewind, or fast forward of one or more video streams. Client system 130 may also provide an option to rewatch an identified interesting moment in the one or more video streams.

Server 162 may also generate a link, wherein the unique link provides access to the persistent real-time group chatroom. A user of a client system 130 may use the unique link to access the persistent real-time group chatroom. The link may be a uniform resource location ("URL"), a link to a web address, a link to an application one the one or more client systems 130, or any other type of link that allows the one or more client systems 130 access to the real-time group chatroom. A user of client system 130 may provide the link to one or more users of additional client systems 130 to invite those one or more users to participate in the group chatroom.

In certain embodiments, a group chatroom comprises one or more administrators. Administrators may have the ability to accept or deny new participants to the group chatroom. Once an administrator accepts a new participant, the new participant may then interact with the other participants in the group chatroom. Moreover, server 162 may notify participants of the addition of a new participant in the group chatroom.

Figure 2:
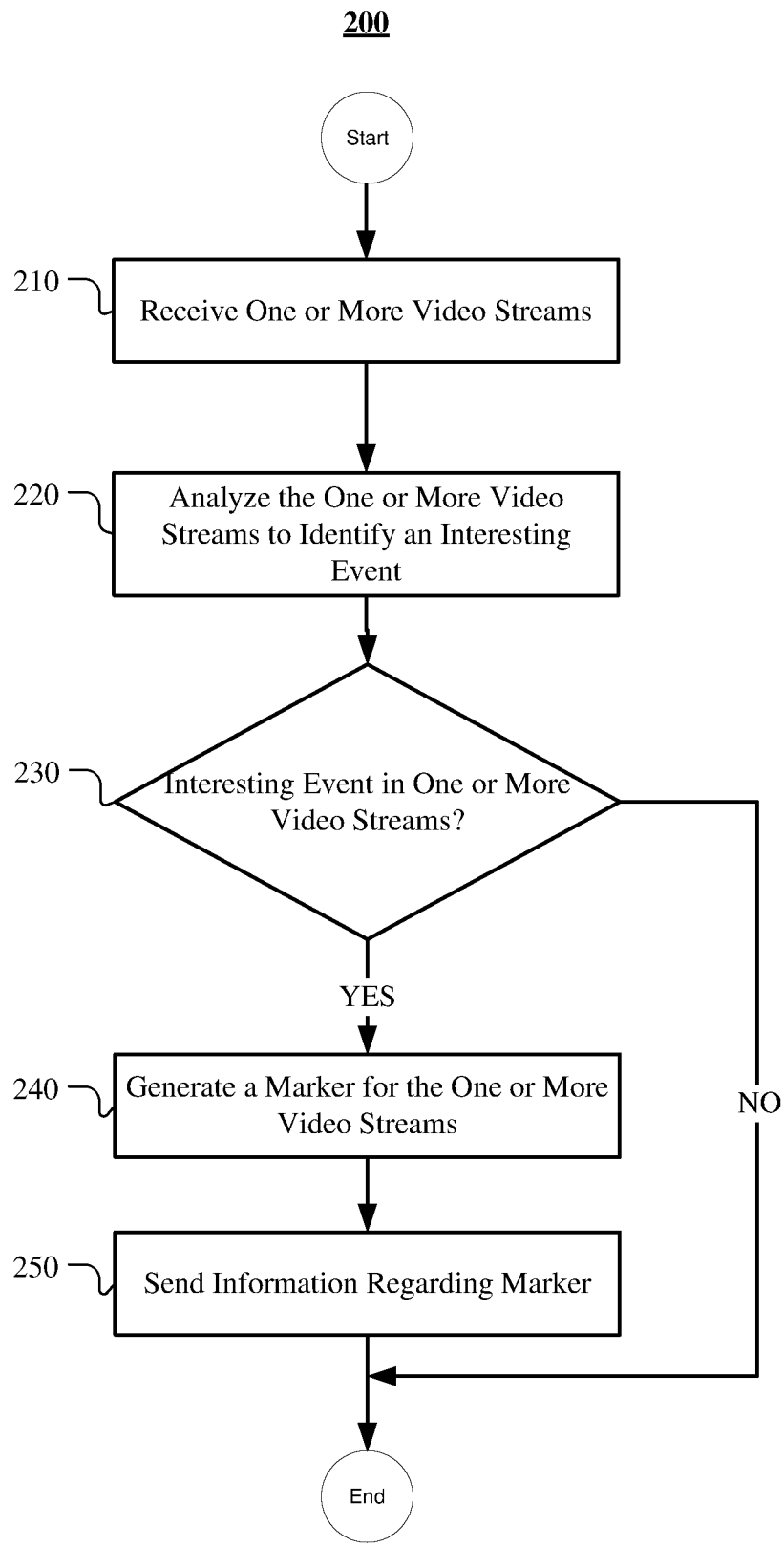
FIG. 2 illustrates an example method for identifying and sending interesting events of one or more video streams in a video session.

FIG. 2 illustrates an example method 200 for identifying and sending interesting events of one or more video streams in a video session. The method may begin at step 210, where server 162 may receive one or more video streams from one or more client systems 130. Client system 130 may capture a video stream by using a video camera, microphone, speaker, or any other mechanism to record video and/or audio. In certain embodiments, a video stream may comprise a video component, an audio component, or both a video and audio component. Client system 130 may transmit a video stream to server 162. In certain embodiments, multiple client systems 130 may each respectively transmit a video stream to server 162. Moreover, the video streams may be associated with a video session. A video session may comprise video streams from one or more video streams associated with one or more users wherein the one or more users are communicating with one another.

At step 220, server 162 may analyze the one or more received video streams to identify an interesting event. An interesting event may be any type of noteworthy event that occurs in a video stream. Server 162 may analyze the one or more received video streams proactively as client system 130 communicates a video stream to server 162 and/or server 162 may analyze the video streams retroactively. In certain embodiments, server 162 may associate one or more actions associated with a video stream as an interesting event. Server 162 may have a preset threshold for when to tag a video as interesting (e.g., a certain number of comments associated with the video stream) or the threshold may be adaptive. Server 162 may also detect a change in audio content and determine that as an interesting moment. Server 162, in addition, may analyze the audio spectrum of the audio stream to determine if a change in the audio is significant to warrant labeling as an interesting moment. In certain embodiments, server 162 detects a change in an attribute of the video stream and/or audio stream, and records that change as an interesting moment. Server 162 may also use facial recognition computer software to identify an emotion associated with a user of client system 130. In certain embodiments, server 162 may identify an interesting moment based on the emotion associated with the user of client system 130. Server 162 may also apply analysis on the environment captured in a video session of client system 130 by detecting a change in the environment, detecting an unusual pattern in the environment, or performing any other type of analysis such that server 162 can detect an interesting moment in the received one or more video stream. In particular embodiments, server 162 may customize the detection of an interesting moment based on information related to the user profile associated with client device 130. Server 162 may customize the detection of an interesting moment based on a user's degree of connection to the user in the video stream, location, attending of same event, likes, dislikes, profile settings, privacy settings, or any other information that may customize the detection of an interesting moment. Moreover, server 162 may determine different interesting moments of a video stream for different users.

At step 230, server 162 determines if the analysis of the one or more video streams identified an interesting event. If server 162 did not identify an interesting event, the method ends. However, if server 162 identifies an interesting event, the method proceeds to step 240.

At step 240, server 162 generates a marker for one or more of the video streams based on a time associated with the identified interesting event. The marker may be a flag associated with the video stream, a table identifying the time associated with the video stream, or any other type of indication for a time associated with the interesting moment. In certain embodiments, server 162 identifies a time period of the video stream containing an interesting moment, and generates a marker indicating the time period. In addition, server 162 may generate a marker that precedes or is subsequent to the identified interesting moment. Server 162 may also record and/or store the one or more video streams for a time period associated with the time related to the identified interesting moment.

In particular embodiments, server 162 may associate information regarding the interesting moment with the information regarding the marker. Additional information, such as actions associated with the interesting moment, video stream associated with the identified interesting moment, or any information about the identified interesting moment, may be associated with the marker.

At step 250, server 162 sends information regarding the marker to the one or more client systems 130. Server 162 may communicate the information regarding the marker in near real-time, or server 162 may communicate the information regarding the marker after the video session is completed. Server 162 may also send the one or more video streams associated with the video session to the one or more client systems 130.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for identifying and sending interesting events of one or more video streams in a video session including the particular steps of the method of FIG. 2, this disclosure contemplates any suitable method for identifying and sending interesting events of one or more video streams in a video session including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
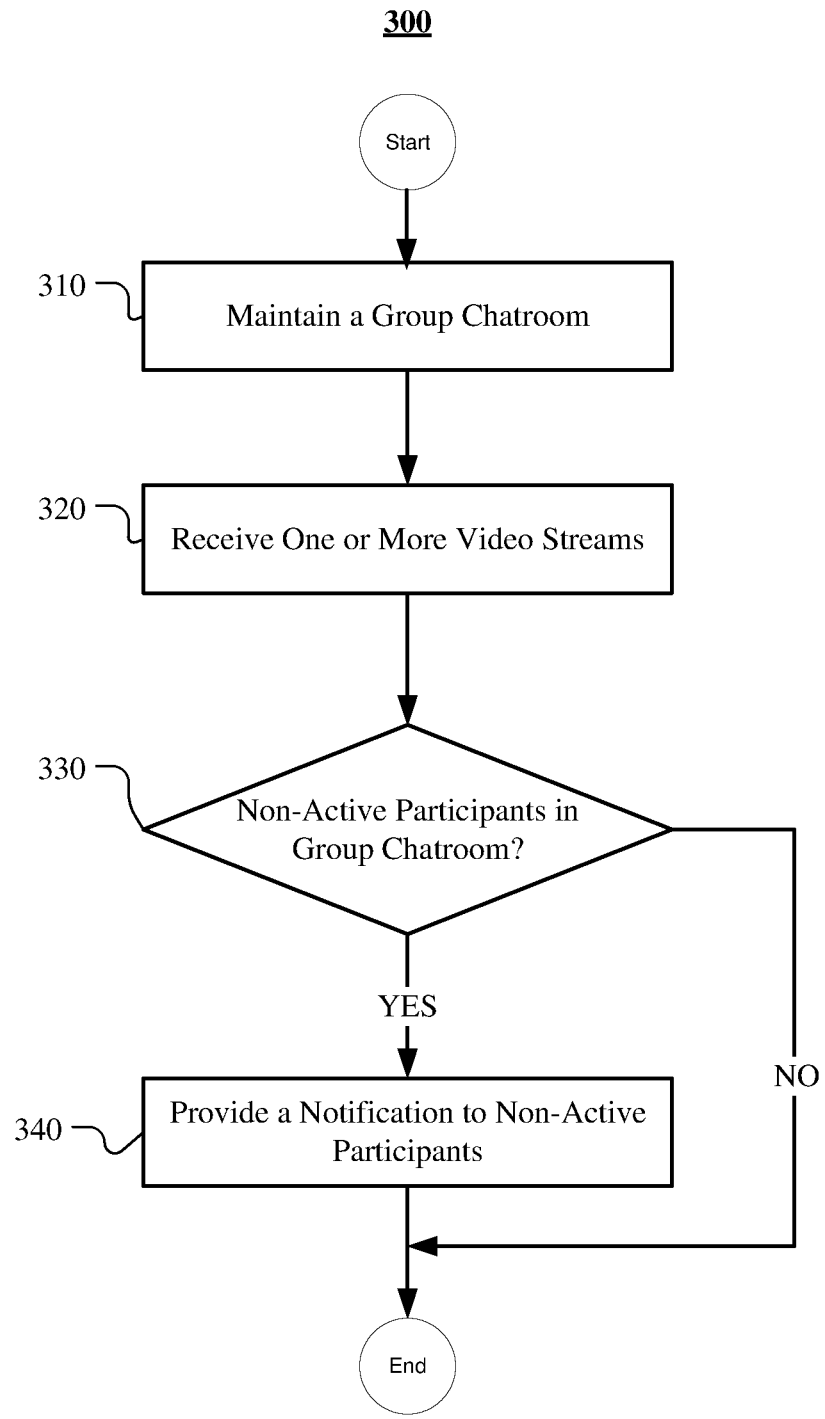
FIG. 3 illustrates an example method for providing a persistent real-time group chatroom that notifies non-active participants of activity in the group chatroom.

FIG. 3 illustrates an example method 300 for providing a persistent real-time group chatroom that notifies non-active participants of activity in the group chatroom. The method may begin at step 310, where server 162 maintains a persistent group chatroom comprising zero or more participants. The persistent real-time group chatroom may, at any given time, have zero or more of the participants are active. In a persistent real-time group chatroom, the chatroom may continue to exist even if zero participants are active in the group chatroom.

At step 320, server 162 may receive, from one or more client systems 130, one or more video streams associated with one or more users. Each client system 130 may respectively be associated with a user. Client 130 may capture and communicate a video stream to server 162. In certain embodiments, client system 130 may encrypt and/or compress the one or more video streams before transmitting the one or more video streams to server 162. Moreover, server 162 may receive, from one or more client systems 130, an action. An action may include a comment in the persistent real-time group chatroom, a like on the chatroom, or any other types of action that is associated with the one or more video streams.

At step 330, server 162 determines if one or more non-active participants are associated with the group chatroom. Non-active participants may be participants that are not active in the persistent real-time group chatroom. If there are no non-active participants in the persistent real-time group chatroom, the method ends. However, if there are non-active participants in the persistent real-time group chatroom, the method proceeds to step 340.

At step 340, server 162 provides a notification to the one or more non-active participants. Server 162 may communicate an e-mail to an e-mail address associated with the non-active participant, server 162 may provide a notification through the group chatroom to the non-active participant, or server 162 may provide an indication on the one or more client systems 130 of the non-active participants.

In certain embodiments, server 162 records the one or more video streams associated with one or more users. A non-active participant may view the one or more video streams associated with one or more users at a later time. In an exemplary embodiment, server 162 identifies interesting moments in the one or more video streams and generates a marker based on a time associated with the identified interesting moments. A non-active participant may view portions of the one or more video streams associated with the time indicated by the marker identifying interesting moments in the one or more video streams. In addition, server 162 may associate a received action with a time and/or one or more video streams. Server 162 may communicate the action alongside the recorded one or more video streams to the one or more non-active participants.

Server 162 may communicate the one or more video streams associated with the video session to client systems 130. Participants of the group chatroom may also pause, rewind, and fast forward through the one or more video sessions. Client system 130 may communicate the pause, rewind, and/or fast forward of the one or more video sessions to server 162, and server 162 may respond with a corresponding portion of the one or more video sessions.

Server 162 may also generate a link, wherein the unique link provides access to the persistent real-time group chatroom. A user of a client system 130 may use the unique link to access the persistent real-time group chatroom. The link may be a URL, a link to a web address, a link to an application one the one or more client systems 130, or any other type of link that allows the one or more client systems 130 access to the real-time group chatroom.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing a persistent real-time group chatroom that notifies non-active participants of activity in the group chatroom including the particular steps of the method of FIG. 3, this disclosure contemplates any suitable method for providing a persistent real-time group chatroom that notifies non-active participants of activity in the group chatroom including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4A:
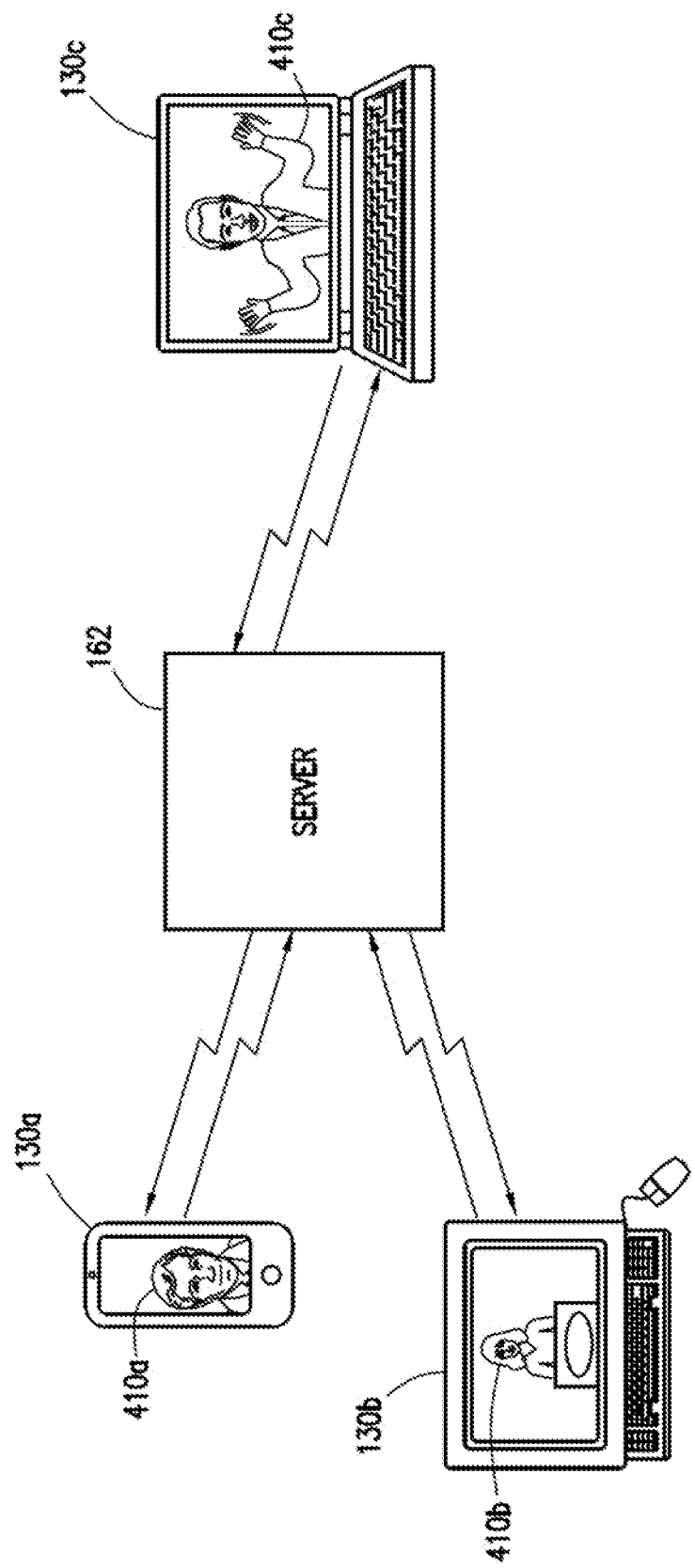
FIGS. 4A-C illustrates an example video session interaction and display frame.
Figure 4B:
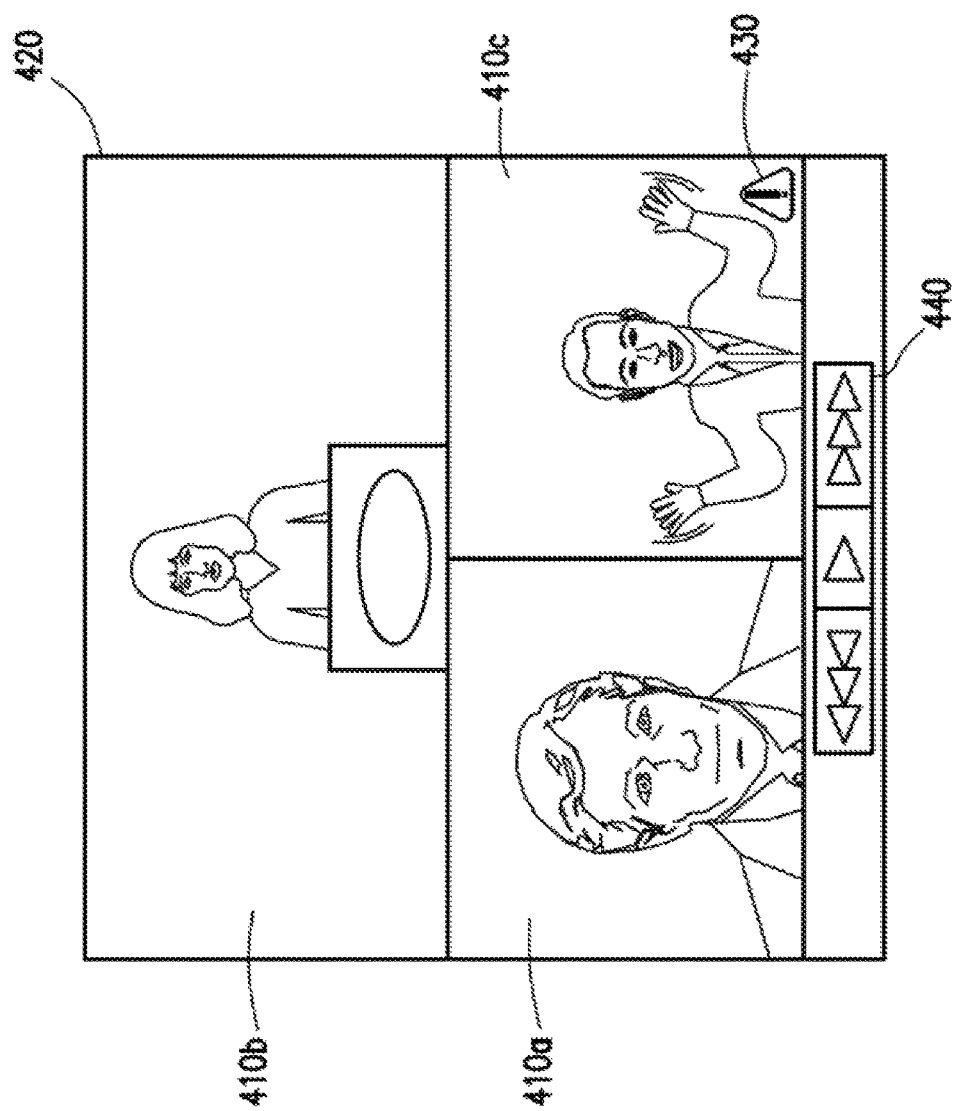
Figure 4C:
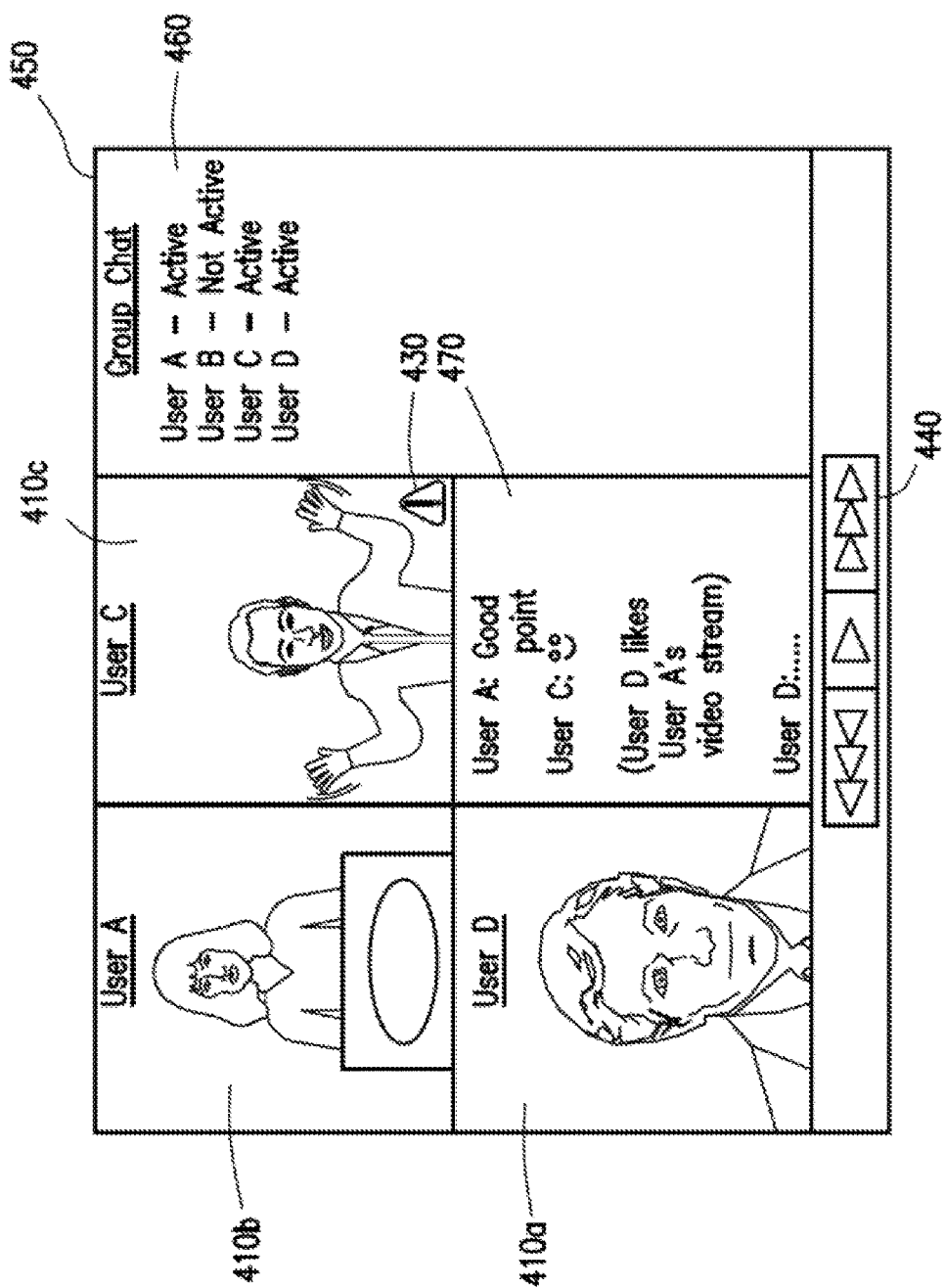

FIGS. 4A-C illustrates an example video session interaction and display frame. More particularly, FIG. 4A-C illustrate server 162 receiving multiple video streams associated with a video session and communicating the video session and markers based on the times associated with the identified interesting moment to one or more client devices 130.

FIG. 4A illustrates an example communication of video streams between a plurality of client systems 130 (e.g., client systems 130a, 130b, and 130c) and server 162. Server 162 may comprise a computer server machine, and client systems 130a, 130b, and 130c may comprise one or more client devices. As illustrated, server 162 receives video streams 410a, 410b, and 410c, respectively, from client systems 130a, 130b, and 130c. In the illustration, video streams 410a, 410b, and 410c comprise a displayed video that is being sent to server 162. In certain embodiments, server 162 communicates the video session comprising one or more received video streams to client systems 130a, 130b, and/or 130c.

FIG. 4B illustrates an example video session frame 420 on one or more client systems 130. As illustrated, video streams 410a, 410b, and 410c are displayed in the example video session frame 420. In certain embodiments, server 162 determines which video streams are displayed in video session frame 420.

Server 162 may determine that video stream 410c contains an interesting event. In this illustrated embodiment, server 162 may determine that video stream 410c contains an interesting event based in part on video stream 410c containing a rapid change in movement. Interesting event indicator 430 represents a visual overlay associated with the identified interesting event. Interesting event indicator 430 may persist as an overlay over video stream 410c for as long as the time associated with the identified interesting moment. In particular embodiments, server 162 determines that video session frame 420 should display video stream 410c because video stream 410c comprises an identified interesting event.

Client systems 130 may control the media output of video session 420. Media controls 440 provide a user of client system 130 the control to play, pause, rewind, and fast forward through video session 420. A user of client system 130 may also focus on one or more video streams 410 associated with the video session. Moreover media controls 440 may provide an indication of the time position of the identified interesting events associated with the one or more video streams 410. In certain embodiments, a user of client system 130 may have the ability to only view the identified interesting events associated with the one or more video streams.

FIG. 4C illustrates an example persistent group chatroom 450 on one or more client systems 130. As illustrated, video streams 410a, 410b, and 410c are displayed in the example persistent group chatroom 420. In certain embodiments, server 162 determines which video streams are displayed in video session frame 420. Server 162 may also determine that video stream 410c contains an interesting event, and may provide interesting event indicator 420 to indicate that video stream 410c is associated with an identified interesting event.

Example persistent group chatroom 450 may contain an identification of a list of participants 460 associated with persistent group chatroom 450. As illustrated, User A, User C, and User D are active participants in persistent group chatroom 450. Server 162 may provide notification to User B that active participants are communicating in persistent group chatroom 450.

Moreover, persistent group chatroom 450 may comprise an action chat room 470 associated with the one or more video streams 410. Action chatroom 470 may contain a dialogue of actions in persistent group chatroom 450. Server 162 may associate the time with the actions (e.g., comments and likes) in action chat room 470 with the video session. Moreover, server 162 may identify interesting moments based in part on the actions in action chat room 470.

Persistent group chatroom 450 may also comprise media controls 440. One or more participants of the persistent group chat room (including User B) may have the ability to play, pause, rewind, and fast forward through video session 420. Moreover, a user of client system 130 may have the ability to only view the identified interesting events associated with a video session. In certain embodiments, actions in action chatroom 470 are displayed simultaneously with the associated time frame of the video session.

Figure 5:
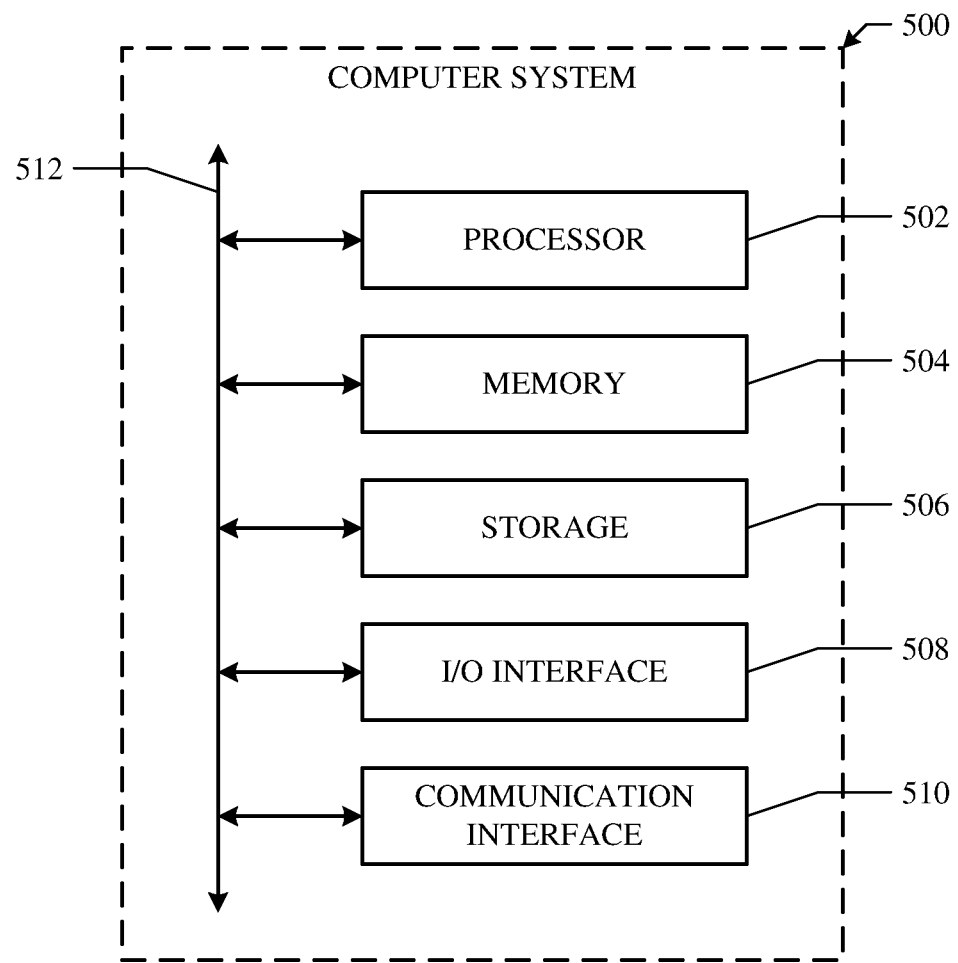
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computer server machine, maintaining a persistent real-time video messaging session, wherein one or more video streams associated with one or more users are associated with the video messaging session, and wherein the one or more users are communicating with each other within the video messaging session;
    by the computer server machine, determining that one of the one or more users has been non-active in the persistent real-time video messaging session for a period of time longer than a threshold;
    by the computer server machine, analyzing the one or more video streams to identify an interesting event;
    by the computer server machine, generating a marker for the one or more of the video streams based on a time associated with the identified interesting event; and
    by the computer server machine, sending information regarding the marker to a client device associated with the one of the one or more users.

2. The method of claim 1, wherein the determining that one of the one or more users has been non-active in the persistent real-time video messaging session for a period of time longer than the threshold comprises detecting that a user interface for the video messaging session on a client device associated with the one of one or more users is not active or open for the period of time.

3. The method of claim 1, wherein the determining that one of the one or more users has been non-active in the persistent real-time video messaging session for a period of time longer than the threshold comprises determining that the one of the one or more users has not provided input to the video messaging session for the period of time.

4. The method of claim 1, wherein the identifying the interesting event is customized based on information related to a user profile associated with the one of the one or more users.

5. The method of claim 1, wherein each of the one or more video streams comprises a video component and an audio component.

6. The method of claim 1, further comprising providing an overlay to one or more of the video streams, wherein the overlay comprises an audio or visual indication corresponding to the identified interesting event.

7. The method of claim 1, wherein analyzing the one or more video streams comprises:
    recognizing an expression in one or more of the video streams; and
    identifying a change in the expression in one or more of the video streams.

8. The method of claim 7, further comprising:
    determining an emotion with the change in the expression; and
    associating information regarding the emotion with the information regarding the marker.

9. The method of claim 1, wherein the analyzing the one or more video streams comprises detecting a change in the audio content captured in one or more of the video streams.

10. The method of claim 1, wherein the analyzing the one or more video streams comprises detecting a change in a scene captured in one or more of the video streams.

11. The method of claim 1, wherein the analyzing the one or more video streams comprises detecting a change in video quality in one or more of the video streams.

12. The method of claim 1, wherein analyzing the one or more video streams comprises detecting a change in an attribute for one or more of the video streams by the computer server machine.

13. The method of claim 1, wherein the sending information regarding the marker to the client device associated with the one of the one or more users comprises communicating an e-mail to an e-mail address associated with the one of the one or more users.

14. The method of claim 1, wherein the sending information regarding the marker to the client device associated with the one of the one or more users comprises providing a notification through the video messaging session.

15. The method of claim 1, wherein the sending information regarding the marker to the client device associated with the one of the one or more users comprises sending instructions to the client device to generate a pop-up notification on the client device.

16. One or more computer-readable non-transitory storage media embodying software that is operable when executed to:
- maintain a persistent real-time video messaging session, wherein one or more video streams associated with one or more users are associated with the video messaging session, and wherein the one or more users are communicating with each other within the video messaging session;
- determine that one of the one or more users has been non-active in the persistent real-time video messaging session for a period of time longer than a threshold;
- analyze the one or more video streams to identify an interesting event;
- generate a marker for the one or more of the video streams based on a time associated with the identified interesting event; and
- send information regarding the marker to a client device associated with the one of the one or more users.

17. The media of claim 16, wherein the determining that one of the one or more users has been non-active in the persistent real-time video messaging session for a period of time longer than the threshold comprises detecting that a user interface for the video messaging session on a client device associated with the one of one or more users is not active or open for the period of time.

18. The media of claim 16, wherein the determining that one of the one or more users has been non-active in the persistent real-time video messaging session for a period of time longer than the threshold comprises determining that the one of the one or more users has not provided input to the video messaging session for the period of time.

19. The media of claim 16, wherein the identifying the interesting event is customized based on information related to a user profile associated with the one of the one or more users.

20. A system comprising: one or more processors; and a memory coupled to the processors comprising instructions executable by the processors, the processors being operable when executing the instructions to:
- maintain a persistent real-time video messaging session, wherein one or more video streams associated with one or more users are associated with the video messaging session, and wherein the one or more users are communicating with each other within the video messaging session;
- determine that one of the one or more users has been non-active in the persistent real-time video messaging session for a period of time longer than a threshold;
- analyze the one or more video streams to identify an interesting event;
- generate a marker for the one or more of the video streams based on a time associated with the identified interesting event; and
- send information regarding the marker to a client device associated with the one of the one or more users.

* * * * *